United States Patent [19]
Wagner et al.

[11] Patent Number: 5,813,088
[45] Date of Patent: Sep. 29, 1998

[54] BACKPACK BLOWER

[76] Inventors: Jeffrey F. Wagner, 6460 N. Montrose Dive, Tucson, Ariz. 85741; Kerry D. Roosmalen, 8983 N. Veridian Dr., Tucson, Ariz. 85743; Darren K. Riley, 1170 N. Reta Dr., Vail, Ariz. 85641; Michael S. Despain, 9583 E. Dunnigan Dr., Tucson, Ariz. 85747; Gary T. Johnson, 1140 E. Canada Vista Pl., Tucson, Ariz. 85737

[21] Appl. No.: 898,965

[22] Filed: Jul. 23, 1997

[51] Int. Cl.$^6$ ..................................................... A47L 9/32
[52] U.S. Cl. .......................... 15/327.5; 15/405; 15/410; 417/234
[58] Field of Search .................... 15/327.5, 344, 15/405, 410; 417/234

[56] References Cited

U.S. PATENT DOCUMENTS

| | | | |
|---|---|---|---|
| D. 204,232 | 4/1966 | Nelson | D9/2 |
| D. 204,366 | 4/1966 | Nelson | D9/2 |
| D. 326,747 | 6/1992 | Stickle | D32/21 |
| 3,165,774 | 1/1965 | Barba | 15/327.5 X |
| 3,331,090 | 7/1967 | Reiber et al. | 15/327.5 X |
| 3,959,846 | 6/1976 | Yasuda | 15/405 X |
| 4,118,826 | 10/1978 | Kaeser | 15/405 X |
| 4,223,419 | 9/1980 | Sato et al. | 15/327 |
| 4,325,162 | 4/1982 | Chambers et al. | 15/327 C |
| 4,658,778 | 4/1987 | Gamoh et al. | 123/195 |
| 4,797,072 | 1/1989 | Berfield et al. | 417/423.2 |
| 4,913,112 | 4/1990 | Iida | 123/198 E |
| 5,011,058 | 4/1991 | Sapp et al. | 224/261 |
| 5,052,073 | 10/1991 | Iida | 15/327.5 |
| 5,133,300 | 7/1992 | Miura | 123/2 |
| 5,174,255 | 12/1992 | Collins et al. | 123/179.1 |
| 5,178,312 | 1/1993 | Iida | 224/261 |
| 5,195,208 | 3/1993 | Yamami et al. | 15/326 |

*Primary Examiner*—Chris K. Moore
*Attorney, Agent, or Firm*—Marshall, O'Toole, Gerstein, Murray & Borun

[57] ABSTRACT

A backpack blower includes a control handle carried by a flexible arm which permits the control handle to be positioned at any location in a three dimensional position range. User comfort and controllability are enhanced.

10 Claims, 7 Drawing Sheets

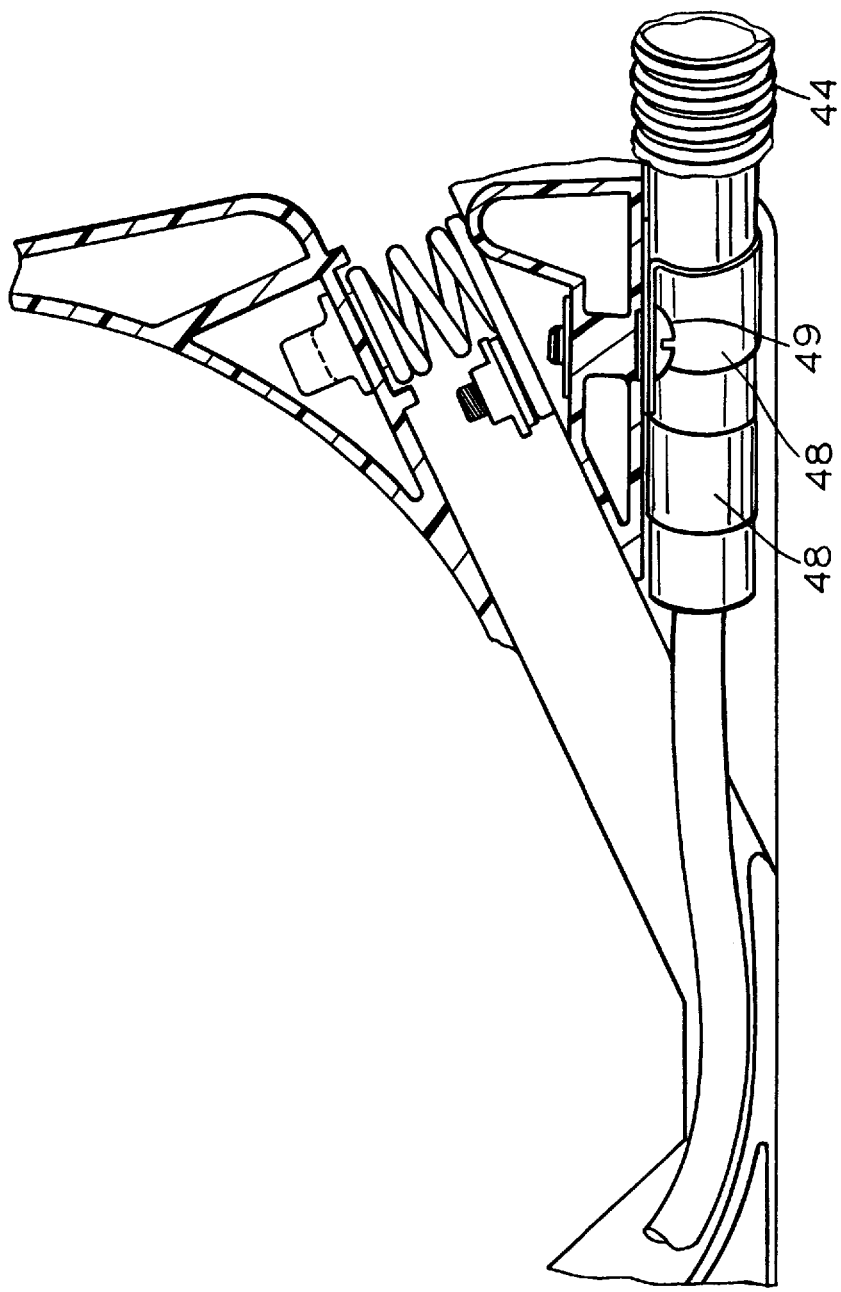

BACKPACK BLOWER

TECHNICAL FIELD

The present invention relates generally to lawn and garden implements, and more particularly to a backpack blower.

BACKGROUND ART

Backpack blowers have been used, typically in lawn and garden applications, to enable an operator to direct a stream of high velocity air toward one or more objects to propel the objects along the ground. Backpack blowers use relatively large gas engines which are mounted on a frame carried on the back of the operator. Such devices are capable of developing flow velocities and flow volumes greater than the capabilities of ordinary hand-held blowers.

Because the motorized blower unit is carried on the back of the operator, some provision must be made to provide controls which can be easily accessed by the user. In prior backpack blowers, a pivoted control arm is provided which can be moved about one or more pivot axes, thereby providing a limited degree of freedom for positioning of the controls. While this limited ability to position the controls at a desired location can contribute to operator comfort and ease of use, it has been found that such a design cannot accommodate the wide variations in size and shape of the human body.

SUMMARY OF THE INVENTION

In accordance with one aspect of the present invention, a backpack blower incorporates features which contribute to the ease of use and safety of the device.

More particularly, a backpack blower includes a motorized blower unit and a control handle mounted on a flexible arm and operable to control the motorized blower unit.

Preferably, the flexible arm comprises a sleeve and hollow flexible tubing disposed in the sleeve. Also preferably, control cables are disposed inside the flexible tubing and are coupled between the motorized blower unit and the control handle.

The present invention permits the control handle to be positioned at any of an infinite number of positions within a three dimensional volume of space, thereby increasing operator comfort and improving the ability to control the blower.

BRIEF DESCRIPTION OF THE DRAWINGS

FIG. 7 is a fragmentary sectional view taken generally along the lines 7—7 of FIG. 6.

DESCRIPTION OF THE PREFERRED EMBODIMENT

Figure 1:
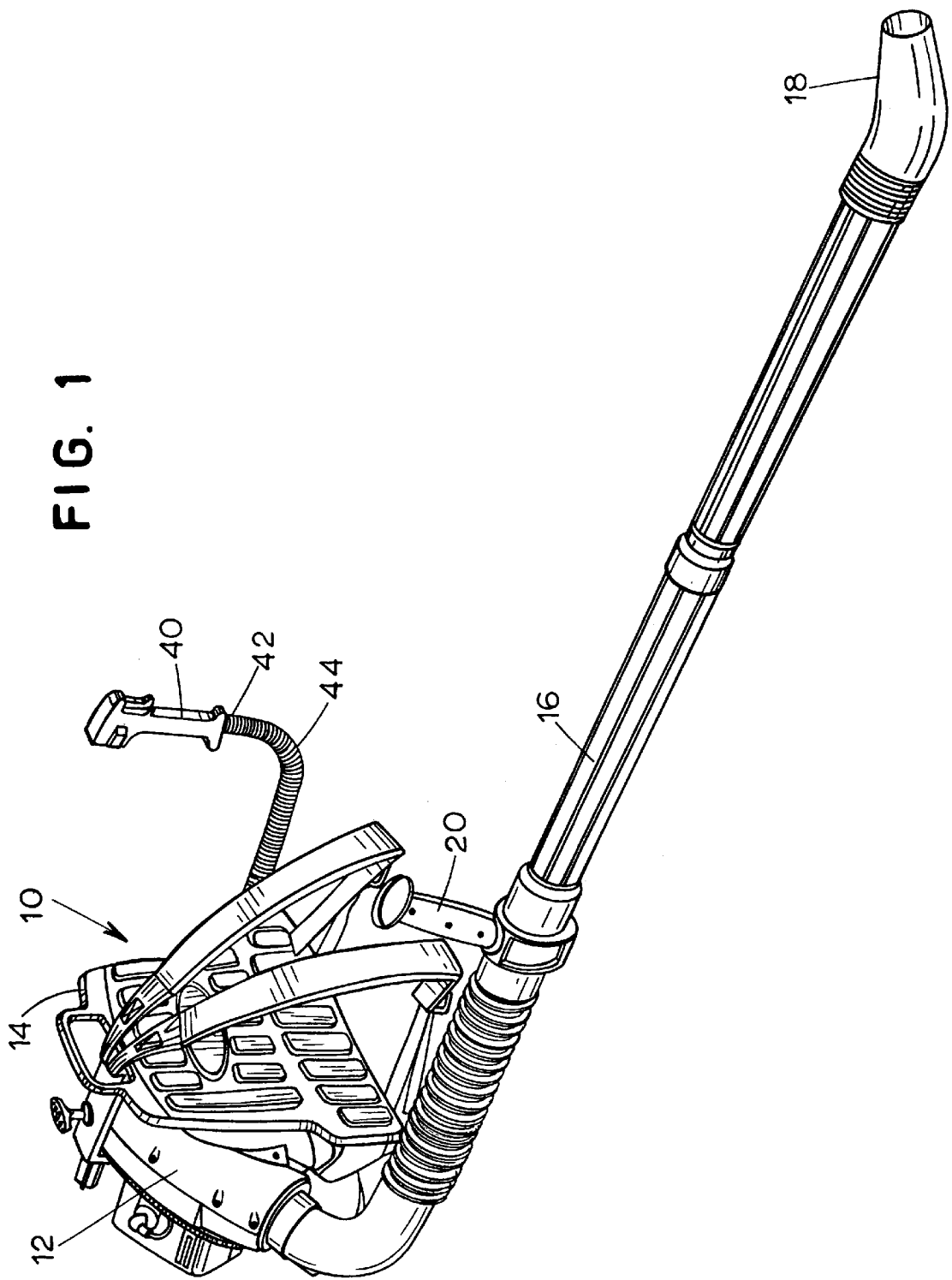
FIGS. 1 and 3 are perspective views of a backpack blower incorporating the present invention.

Referring now to the Figs., a backpack blower 10 includes a motorized blower unit 12 including an engine 13 mounted on a frame 14. A blower nozzle assembly 16 is coupled to the motorized blower unit 12 and conducts a stream of air toward a nozzle 18, from which the stream of air is discharged. The nozzle assembly 16 includes a handle or grip 20 which may be grasped by a user to direct a nozzle assembly 16 as desired.

Figure 5:
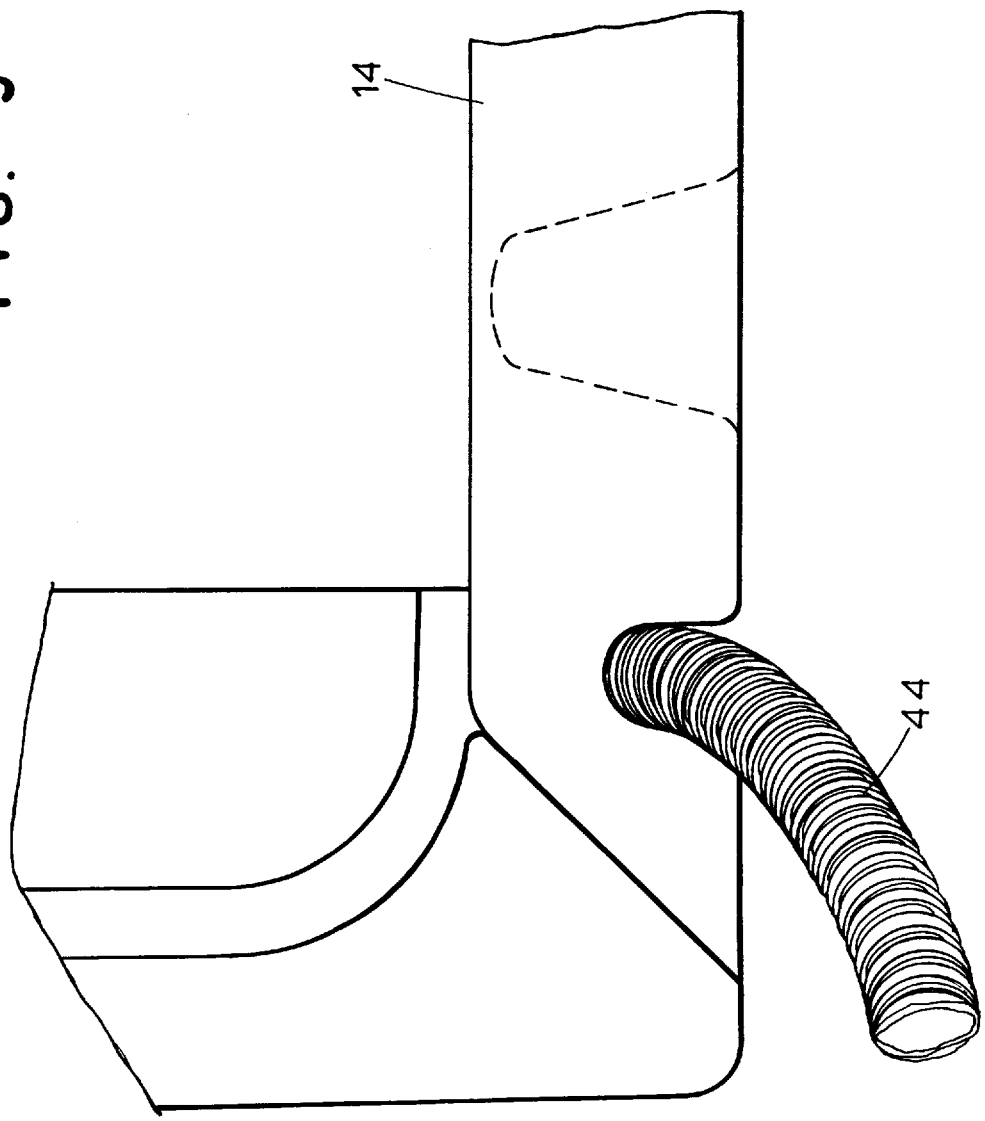
FIG. 5 is a fragmentary side elevational view of a portion of the frame and blower unit of FIGS. 1–3.
Figure 6:
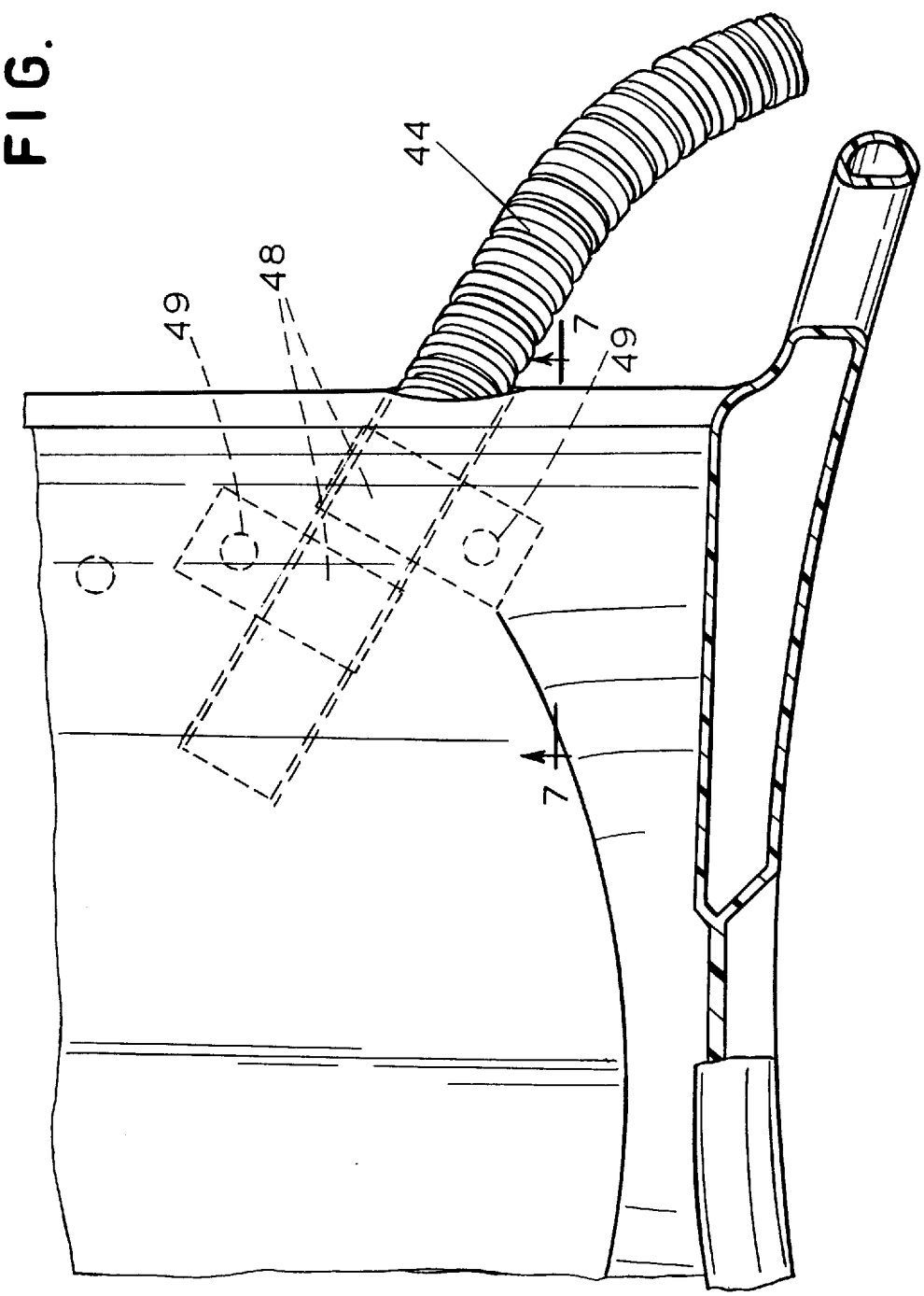
FIG. 6 is a fragmentary plan view partially in section of the frame of FIG. 5 with the blower unit removed therefrom illustrating the attachment of the flexible arm in phantom.

A control handle 40 is disposed on and coupled by any suitable means to a first or distal end 42 of a flexible arm 44. A second or proximal end 46 of the flexible arm 44 is coupled by any suitable means such as one or more straps 48 and fasteners 49 (FIGS. 5–7) to the frame 14 and/or the blower unit 12. The control handle 40 is adapted to be grasped by the user to allow the user to operate and control the blower unit 12.

Figure 2:
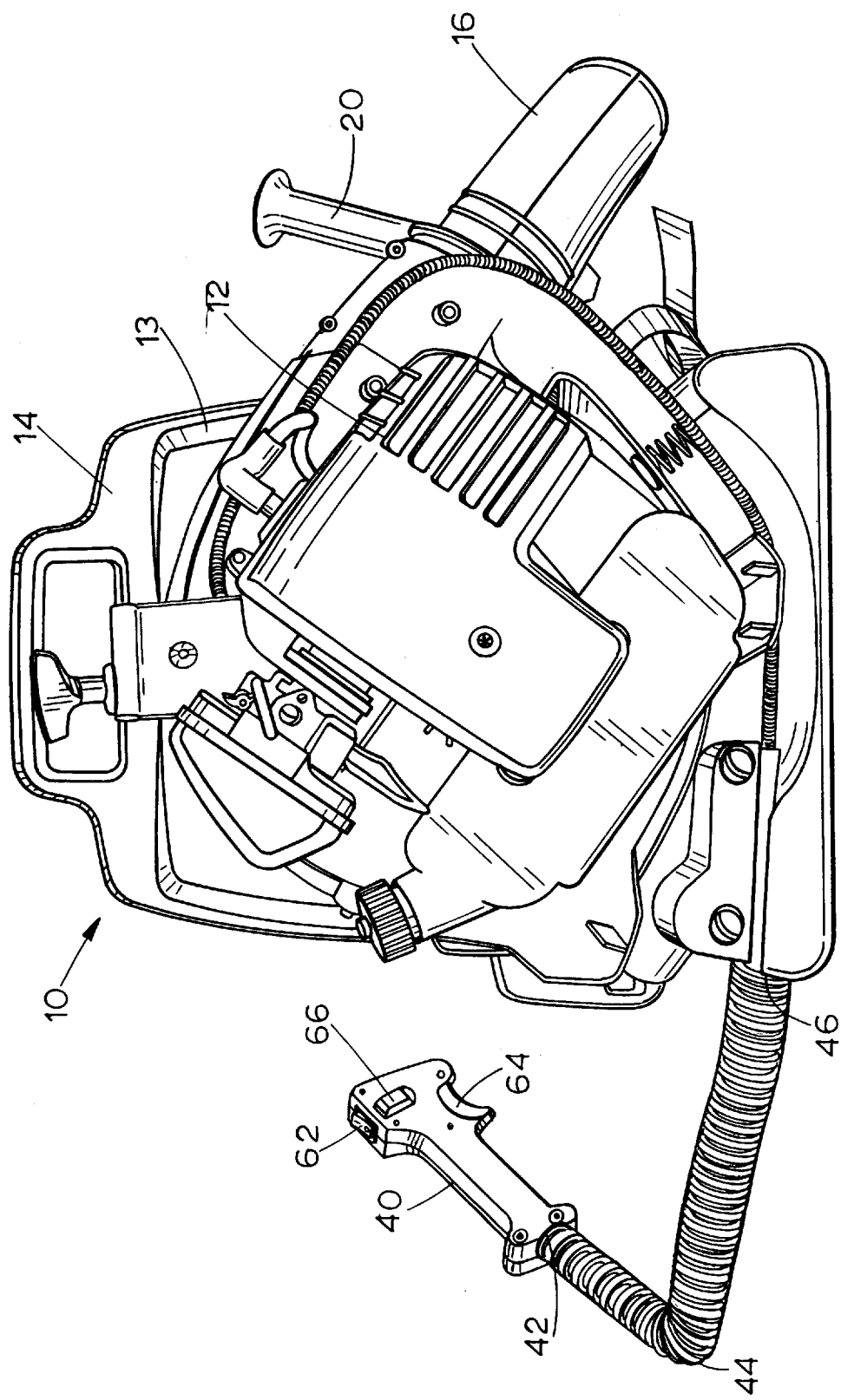
FIG. 2 is a rear elevational view of the backpack blower of FIG. 1.
Figure 3:
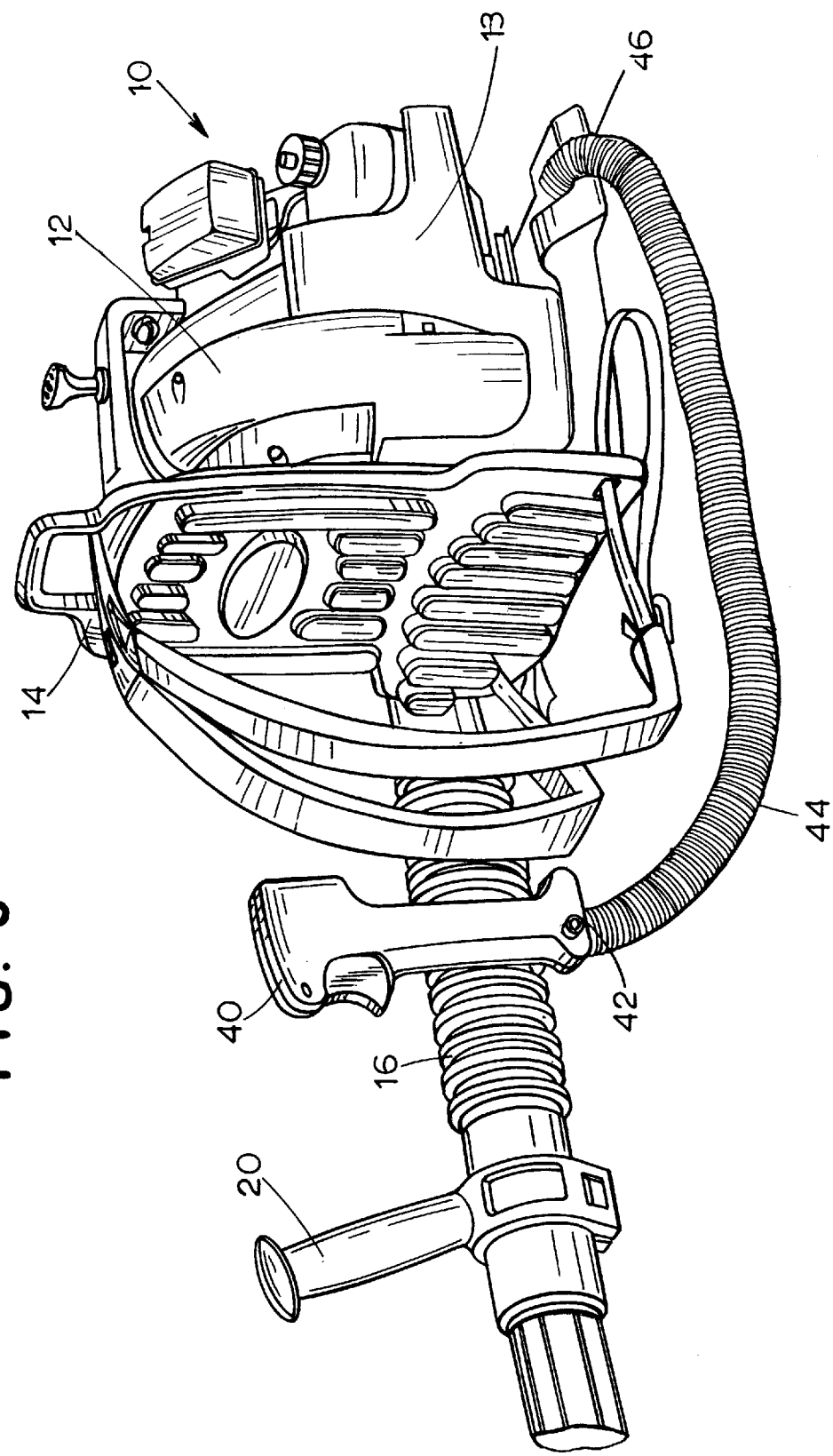
Figure 4:
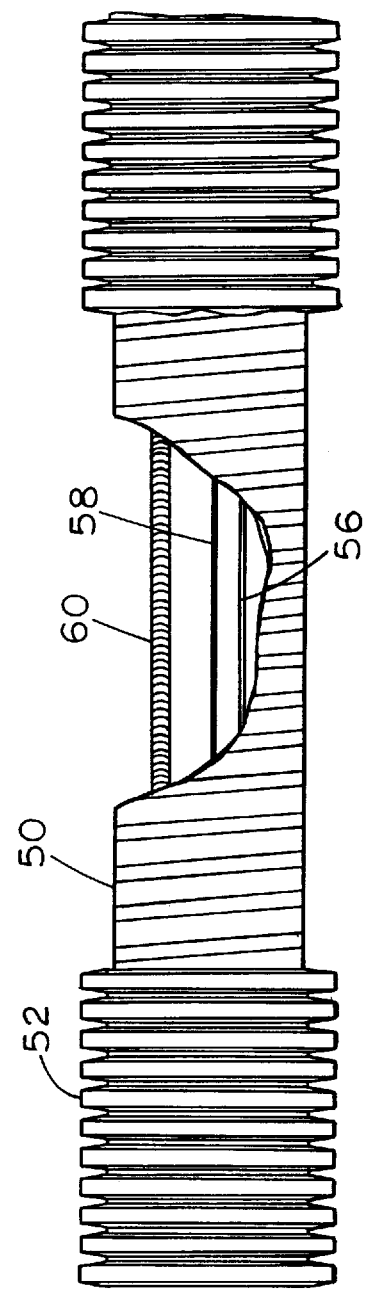
FIG. 4 is a fragmentary elevational view, with portions broken away, illustrating the flexible arm of FIGS. 1–3 in greater detail.

Referring specifically to FIG. 4, the flexible arm 44 comprises a hollow flexible core 50 surrounded by a corrugated outer liner or sleeve 52 fabricated of flexible plastic, rubber or any other suitable material(s). The flexible core 50 is a commercially available product fabricated of metal and sold by Vermont Flexible Tubing Company, Inc. of Lyndonville, Vermont and is identified as one-half inch inside diameter galvanized tubing. A pair of electrical wires 56 and 58 run through the flexible arm 44. In addition, a cable 60 extends through the flexible arm 44. A stop control switch 62 (FIG. 2) is provided to stop the engine 13. A throttle trigger 64 controls the speed of the engine and a lock 66 allows the throttle to be maintained in an open position without pressure on throttle trigger 64 (FIG. 2). Preferably, the core 50 has sufficient space therein to accommodate electrical wires 56, 58 and the cable 60 such that the arm can be moved to any desired position without kinking or seizing of the components 56, 58 and 60. Further, the flexible core 50 retains its shape after the control handle 44 is moved to the desired position.

Other flexible cores of different design, material(s), etc., could be used, provided that the core remains in shape (i.e., has a memory) once moved to a desired position.

As should be evident from the foregoing, the control handle 40 is positionable at any of an infinite number of positions within a three-dimensional range. As a result, a much wider range of persons can be comfortably accommodated as compared with pivoting arms, which typically permit movement in only a limited number of planes. Controllability is therefore enhanced. Further, because the flexible arm 44 retains its shape after adjustment, the operator does not have to exert constant pressure on the control handle and fatigue is reduced.

Numerous modifications and alterative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without department from the spirit of the invention, and the exclusive use of all modifications which come within the scope of the appended claims is reserved.

We claim:

1. A backpack blower, comprising:
    a motorized blower unit; and
    a control handle mounted on a flexible arm and operable to control the motorized blower unit, wherein the flexible arm retains its shape upon being moved to a desired position.
2. The backpack blower of claim 1, wherein the flexible arm comprises a sleeve and hollow flexible tubing disposed in the sleeve.

3. The backpack blower of claim 1, further including control cables inside the flexible tubing and coupled between the motorized blower unit and the control handle.

4. The backpack blower of claim 1, wherein the sleeve is corrugated.

5. The backpack blower of claim 1, wherein the sleeve is fabricated of plastic.

6. The backpack blower of claim 1, wherein the flexible tubing is fabricated of metal.

7. A backpack blower, comprising:

a frame adapted to be carried on a back of a user;

a motorized blower unit mounted on the frame;

a flexible arm having a proximal end coupled to at least one of the frame and the blower unit, the flexible arm comprising hollow metal tubing; and a control handle mounted on a distal end of the flexible arm and including a user control element.

8. The backpack blower of claim 7, wherein a control cable extends through the hollow metal tubing.

9. The backpack blower of claim 8, further including a flexible plastic sleeve surrounding the hollow metal tubing.

10. The backpack blower of claim 9, wherein the plastic sleeve is corrugated.

\* \* \* \* \*